(12) United States Patent
Gonia et al.

(10) Patent No.: US 8,396,007 B2
(45) Date of Patent: Mar. 12, 2013

(54) WIRELESS DEVICE DEPLOYMENT WITH RELIABLE LINKS

(75) Inventors: Patrick S. Gonia, Maplewood, MN (US); Ishwara Bhat, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 388 days.

(21) Appl. No.: 12/761,635

(22) Filed: Apr. 16, 2010

(65) Prior Publication Data

US 2011/0255426 A1    Oct. 20, 2011

(51) Int. Cl.
*H04L 12/26* (2006.01)
(52) U.S. Cl. ........ 370/252; 370/310; 455/423; 455/500; 342/173
(58) Field of Classification Search .................. None
See application file for complete search history.

(56) References Cited

U.S. PATENT DOCUMENTS

| | | | |
|---|---|---|---|
| 6,288,639 B1 | 9/2001 | Addy | |
| 6,397,063 B1 * | 5/2002 | Sessions et al. | 455/425 |
| 2007/0184850 A1 * | 8/2007 | Hupp et al. | 455/456.1 |
| 2008/0158052 A1 * | 7/2008 | Chen et al. | 342/357.06 |
| 2008/0253309 A1 | 10/2008 | Obranovich | |
| 2009/0196206 A1 * | 8/2009 | Weaver et al. | 370/310 |
| 2010/0246419 A1 * | 9/2010 | Batta et al. | 370/252 |

OTHER PUBLICATIONS

"European Application Serial No. 11159823.1, European Search Report mailed Oct. 18, 2011", 3 pgs.
"European Application Serial No. 11159823.1, Office Action mailed Oct. 31, 2011", 6 pgs.
"European Application Serial No. 111598231, Response filed Feb. 14, 2012 to Office Action mailed Oct. 31, 2011", 12 pgs.

* cited by examiner

*Primary Examiner* — Chi H. Pham
*Assistant Examiner* — Shick Hom
(74) *Attorney, Agent, or Firm* — Schwegman, Lundberg & Woessner, P.A.

(57) ABSTRACT

The embodiments are related to deploying wireless devices in a space to maximize a monitored area. In an embodiment, the system includes at least one first wireless device installed into a first position and set in a placed mode, and a second wireless device to be installed into a second position and set in an unplaced mode. The second wireless device is moved away from the at least one first wireless device. An application message is transmitted at a normal operating power. A link quality detection message is transmitted at a reduced power lower than the operating power by a headroom. The link quality between the at least one first wireless device and the second wireless device is estimated based on the link quality detection message to determine the second position to install the second wireless device. Once installed, the second wireless device is switched to the placed mode.

20 Claims, 3 Drawing Sheets

WIRELESS DEVICE DEPLOYMENT WITH RELIABLE LINKS

TECHNICAL FIELD

Various embodiments described herein relate generally to a wireless system, and more particularly to a deployment of wireless detectors in the wireless system.

BACKGROUND

Detectors may be used for example around an accident site to detect the presence of dangerous gases and to relay the information over multiple hops from device to device via wireless communications. The detectors may also be used for example in an environment to monitor a person entering a confined space. The detectors may relay the information over multiple hops to an attendant outside the confined space. However, it is a challenging task to deploy the detectors as far apart as possible in order to maximize the area monitored while retaining reliable wireless communications.

BRIEF DESCRIPTION OF THE DRAWINGS

Some embodiments are illustrated by way of examples, and not by way of limitation, in the figures of the accompanying drawings in which.

DETAILED DESCRIPTION

Figure 1:
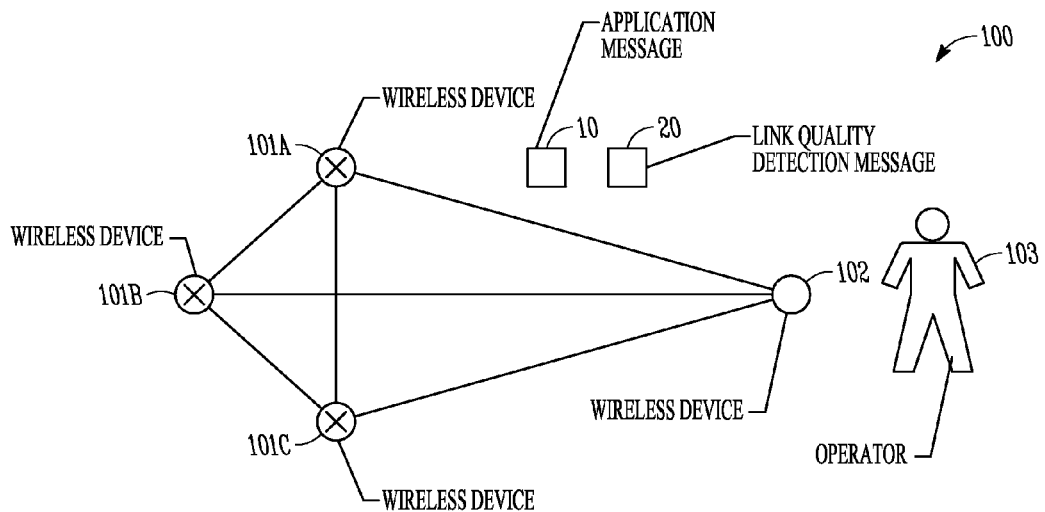
FIG. 1 is a diagram illustrating a wireless system according to an example embodiment.

In the following detailed description of embodiments of the subject matter, reference is made to the accompanying drawings, which form a part hereof, and in which is shown by way of illustration some embodiments in which the subject matter may be practiced.

The term "RSSI" in the description refers to a receive signal strength indication, which is a measure of a radio frequency (RF) signal strength of a given received packet.

In an exemplary entrant/attendant mode use case, many (e.g., 4) wireless devices may be deployed and configured with a maximum link range while maintaining reliable links between the devices. The wireless devices may be RF peers for detecting gases and may report to an attendant every 5 seconds for example. The first wireless device A at the attendant location may be first positioned outside a confined space and placed into a placed mode. The attendant may enter the confined space with other wireless devices (e.g., R1 and R2) in his backpack. The attendant may move away from the placed wireless device (or node) A. One of the other wireless devices (e.g., R1) may present the link quality from the placed node A to the wireless device R1 via a liquid crystal display (LCD) on the wireless device R1 for example. If the link to the placed node A reaches a limit, the wireless device R1 can be positioned and configured into a placed mode. The attendant may further move away from the wireless device R1 with another wireless device R2 in his backpack. The wireless device R2 may present the link quality from the placed wireless device R1 via an LCD on the wireless device R2 for example. If the link quality with the placed node R1 reaches a limit, the wireless device R2 can be positioned and configured into a placed mode. This process may repeat as desired for additional repeater devices. The last wireless device may be carried by the entrant operator and switched into an operational state wherein it continues to monitor the link quality to the last repeater node. The entrant operator may start work tasks while the operational state device monitors the link quality and alerts the entrant and attendant operators if any link quality falls below the limit.

In another exemplary incident/response mode use case, many (e.g., less than 21) wireless devices will be deployed and configured with a maximum link range while maintaining reliable links. The wireless devices may be RF peers for detecting gases and may report to each other every 5 seconds for example while monitoring an incident site. The first wireless device Node 1 may be first positioned near an incident site and placed into a placed mode. The operator installing the devices may move around the incident site with other wireless devices (e.g., nodes 2 and 3 up to e.g. 20) in his backpack. The operator may move away from the placed wireless device (or node) 1 for example. One of the other wireless devices (e.g., Node 2) may present the link quality from the placed node 1 to the wireless device 2 via an LCD on the wireless device 2 for example. If the link to the placed node 1 reaches a limit, the wireless device 2 can be positioned and configured into a placed mode. This process repeats until the last of the other wireless devices has been positioned and configured into the placed mode. The last positioned wireless devices may be switched into an operational state if necessary, and then gas detection may continue with assured reliable links among all devices.

For additional link reliability each node after the $2^{nd}$ may report link quality on its LCD as reaching a limit at a time when one link to one other device is at or above the link quality limit and a $2^{nd}$ link to a $2^{nd}$ device reaches the limit. This then assures each device has at least two reliable links.

In some embodiments, a wireless system may be used to deploy wireless detectors to maximize an area monitored while retaining reliable wireless communications. The system comprises at least one first wireless device installed into a first position and set in a placed mode, and a second wireless device to be installed into a second position and set in an unplaced mode. The second wireless device is moved away from the at least one first wireless device.

In an embodiment, an application message is transmitted at a normal operating power. A link quality detection message is transmitted at a reduced power that is lower than the operating power by a headroom. The headroom may be the difference in transmit power between the application message and the link quality detection message. At least one link quality between at least one of the at least one first wireless device and the second wireless device is estimated based on the link quality detection message. The at least one estimated link quality is used by the second device to determine the second position to install the second wireless device. The objective is to allow the second device to be moved as far away as possible while maintaining the reliability of the application message. Once installed, the second wireless device is switched to the placed mode. The second wireless device then becomes available as one of the at least one first wireless devices to be used for estimating link quality for the next device to be installed.

In another embodiment, a receive signal strength indicator (RSSI) is used to measure a link quality from at least one of the at least one first wireless device to the second wireless device. When a difference between the RSSI and a base level is determined and wherein when the last one of the differences is found reduced to no more than a headroom, the second position is determined and the second wireless device signals to install the second wireless device. The base level is either a sensitivity level or a noise level, or it may be whichever is greater. Once installed, the second wireless device is switched to the placed mode.

In some embodiments, a method may be used to deploy wireless detectors to maximize an area monitored while retaining reliable wireless communications. The method may comprise, for example, installing at least one first wireless device in a placed mode into a first position in a wireless infrastructure; moving a second wireless device in an unplaced mode away from the at least one first wireless device; transmitting a link quality detection message at a reduced transmit power lower than the normal operating power used for application messages by a headroom; estimating a link quality between the at least one first wireless device and the second wireless device based on the link quality detection message; and determining a second position to install the second wireless device by using the estimated link quality. An application message is transmitted at a normal operating power in order to provide an assurance that the application messages transmitted at a normal power will be reliably received considering the link quality detection is done at a lower power.

In some embodiments, another method may be used to deploy wireless detectors to maximize an area monitored while retaining reliable wireless communications. The method may comprise, for example, installing at least one first wireless device in a placed mode into a first position in an area to be monitored by the detectors; moving a second wireless device in an unplaced mode away from the at least one first wireless device; measuring a link quality from the at least one first wireless device to the second wireless device by using a receive signal strength indicator (RSSI); determining a difference between the RSSI and a base level and signaling to install the second wireless device, when the last one of the differences is found reduced to no more than a headroom at a second position.

In some embodiments, a wireless device may comprise a transceiver to transmit and receive wireless communication signals, a power supply to supply power to the transceiver, and a switch to switch the wireless device between an unplaced mode and a placed mode. The switch may be for example a push button accompanied by an LCD display identifying the function as a mode switch. An application message is transmitted at an operating power. A link quality detection message is transmitted at a reduced power that is lower than the operating power by a headroom. A link quality between the wireless device in the unplaced mode and one or more other wireless devices in a placed mode is estimated based on the link quality detection message.

The embodiments optimize the deployment of wireless devices such that the link distances between them can be maximized, while the reliability of communications is retained and very little user attention is needed.

FIG. 1 is a diagram illustrating a wireless system 100 according to an example embodiment.

In some embodiments, the wireless system 100 comprises one or more first wireless devices 101 (e.g., 101A, 101B and 101C) each installed into a first position and set in a placed mode, and a second wireless device 102 to be installed into a second position and set in an unplaced mode. The second wireless device 102 is moved away from the first wireless devices 101. In an embodiment, each of the first and second wireless devices may be operable in a placed mode or an unplaced mode, and can switch from the unplaced mode to the placed mode.

In one situation, an application message 10 may be transmitted at a normal operating power, and a link quality detection message 20 is transmitted at a reduced power that is lower than the operating power by a headroom. A link quality between at least one of the first wireless devices 101 and the second wireless device 102 is estimated based on the link quality detection message 20. The estimated link quality is used by the second wireless device 102 to determine the second position to install the second wireless device 102. Once installed, the second wireless device 102 is switched to the placed mode. The second wireless device then becomes available as one of the at least one first wireless devices to be used for estimating link quality for the next device to be installed. Then, another second wireless device 102 may be installed. This installation process may be iterative to install more wireless nodes.

In some embodiments, two peer nodes (e.g., a placed node and an unplaced node) may assess the link quality between them such that the unplaced node may be placed such that the link quality is adequate. To measure link quality, packets may be sent by one of the peers at a reduced power that is lower than the normal application message operating power by a headroom. For example, if the application packets are sent at full power (e.g. +16 dBm) and the link quality assessment packets (hello packets) are sent at a reduced level (e.g. +6 dBm), the difference is the head room of e.g. 10 dB. Since the link quality assessment packet demonstrate that the peers can communicate at 6 dBm, application messages can tolerate 10 dB of path attenuation variation before application messages will be affected by errors.

In some embodiments, when the last one of the link quality estimates is found reduced to no more than a minimum level, the second position is determined and the second wireless device 102 signals to an operator 103 to install the second wireless device 102. For example, the operator 103 may carry one or more second wireless devices 102 in his backbag in order to deploy them.

In some embodiments, there are at least two link quality estimates that are considered simultaneously. When one link quality estimate remains at or above a minimum level and when the last one of the other estimated link quality estimates is found reduced to no more than the minimum level, the second position is determined and the second wireless device 102 signals to the operator 103 to install the second wireless device 102.

In some embodiments, the link quality detection message 20 is a message packet send at a reduced power. The link quality is detected by at least one of a loss of the message packet or a loss of an acknowledgement packet for the message packet. For example, the loss for packets may be used to assess the link quality. For example, if 10 packets are sent and 5 packets are acknowledged, the link quality may be 50%. The lost packets could be those that were sent or the acknowledgements (ACKs) that were to come back or any combination.

Figure 2:
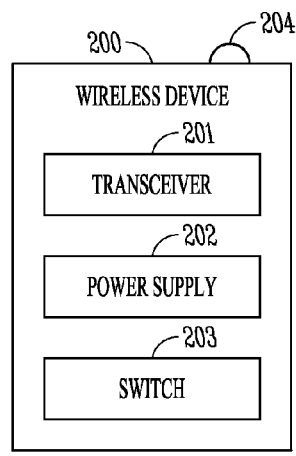
FIG. 2 is a diagram illustrating a wireless device according to an example embodiment.

In some embodiments, the signal is presented to the operator 103 using an installation indicator (e.g., 204 as shown in FIG. 2). The installation indicator 204 may be an LCD display icon, a vibrator, or a sound maker, or a combination of them.

In another situation, a receive signal strength indicator (RSSI) may be used to measure a link quality from at least one of first wireless devices 101 to the second wireless device 102. For example, the RSSI may be measured by a receiver RF device (e.g., the second wireless device 102) for a given application message (packet) heard from a peer (e.g., one of the first wireless devices 101). The receiver RF device reports an RSSI value which varies such that stronger signals can be distinguished from weaker signals. An average RSSI from a number of packets received from the peer may also be used. If the peer is very close by, the RSSI may be measured at e.g., −30 dBm. Whereas if the peer is nearly at the farthest distance that the receiver can detect due to the receiver sensitivity level, the RSSI may be measured at e.g., −85 dBm. In an embodiment, either or both of the first wireless device 101 and the second wireless device 102 may measure RSSI. The measurement results are made available to the second wireless device 102 for determining the placement of the second wireless device 102.

In some embodiments, when the last one of the differences between the RSSI level and a base level is found reduced to no more than a headroom, the second position is determined and the second wireless device 102 signals the operator 103 to install the second wireless device. Once installed, the second wireless device 102 is switched to the placed mode. The headroom may depend on the sensitivity of the receiver (e.g., the second wireless device 102). For example, if the receiver can properly receive at −85 dBm (the sensitivity level) and application packets from the peer are arriving at −60 dBm, there is a 25 dBm (85-60) of headroom. If only 10 dB of headroom is needed, the second wireless device 102 can move farther way until the application messages are received at RSSI=−75 dBm.

In an embodiment, the base level is a sensitivity level of a device (e.g., the second wireless device 102). In another embodiment, the base level is a noise level measured by the second device 102. In another embodiment, the base level may be the greater of the sensitivity level and the noise level.

FIG. 2 is a diagram illustrating a wireless device 200 according to an example embodiment.

The wireless device 200 may include a transceiver 201 to transmit and receive wireless communication signals, a power supply 202 to supply power to the transceiver 201, and a switch 203 to switch the wireless device 200 between an unplaced mode and a placed mode. In an embodiment, the wireless device 200 may also include an installation indicator 204 to indicate an operator 103 to install the wireless device 200 once the link quality reduced to a minimum level. The installation indicator 204 may be selected from at least one of an LCD display icon, a vibrator, or a sound maker.

In some embodiments, an application message is transmitted at an operating power, and a link quality detection message is transmitted at a reduced power that is lower than the operating power by a headroom.

In some embodiments, a link quality between the wireless device 200 in the unplaced mode and one or more other wireless devices in a placed mode is estimated based on the link quality detection message.

In some embodiments, when the link quality is found reduced to a minimum level, the wireless device 200 signals to the operator 103 to install the wireless device 200. In some embodiments, the wireless device 200 indicates to install the wireless device 102 once the last one of the link quality estimates is reduced to no more than a minimum level. Once installed, the wireless device 200 is switched to the placed mode.

In some embodiments, the last one of the second wireless devices 102 may remain in the unplaced mode and thus may continue to notify the operator 103 when the link quality reaches the limit. In a situation, the wireless detectors 101 and 102 may be used to monitor the environment for a person entering a confined space for example. The detectors 101 may relay the information over multiple hops to and attendant outside the confined space. The entrant operator 103 may wish to remain mobile but also remain reliably connected to the first wireless nodes 101. As the operator 103 moves about, he will be notified by the indicator 204 of the last one of the wireless devices 102 that he is moving too far away and must come closer to the first wireless nodes 101 to continue working. In this way, this last one of the second wireless devices 102 is used as a roaming device to indicate to the operator 103 as to whether the operator 103 is roaming too far.

For example, in an entrant attendant mode, the operator (or attendant) 103 may place a device into a placed mode outside a confined space, then two more devices will be placed along a chain into a confined space (e.g., a tunnel) then the last device 102 is carried by the operator 103 who continuously moves. In this case, the operator 103 needs to be signaled if he roams too far away from the placed nodes 101.

Figure 3:
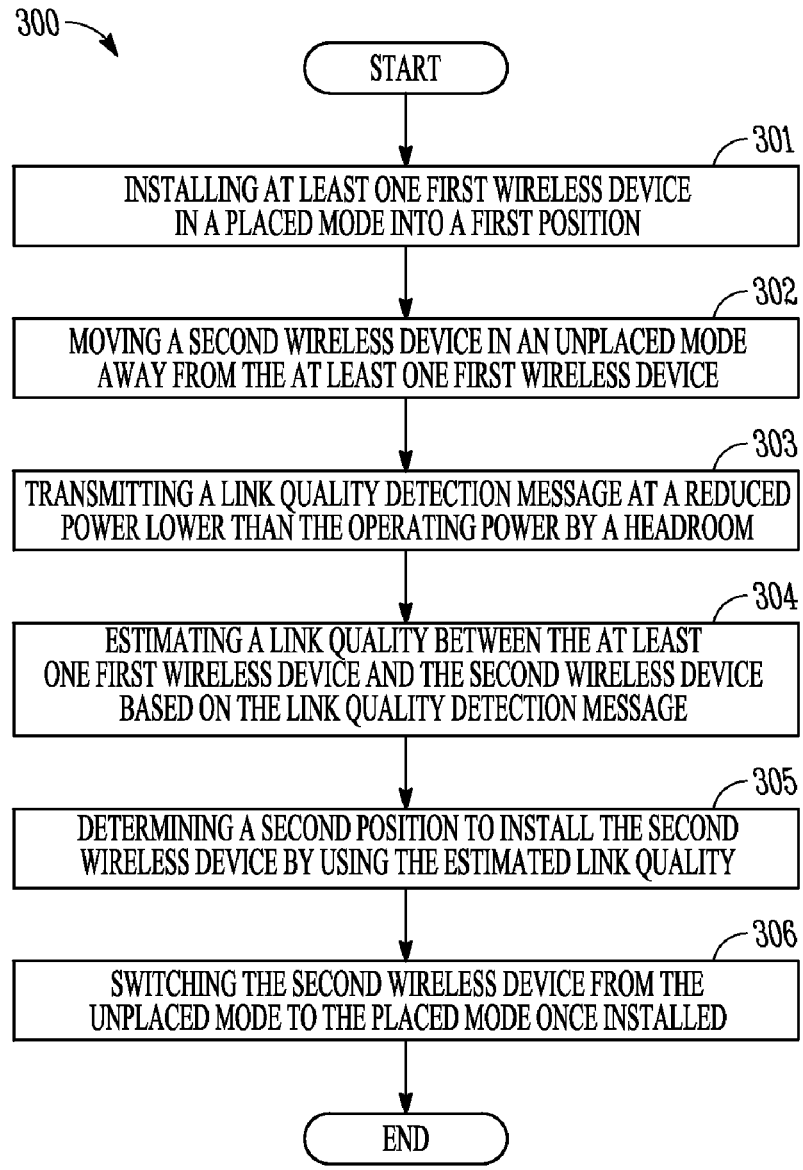
FIG. 3 is a flow diagram illustrating a method of deploying wireless devices while retaining reliable links according to an example embodiment.

FIG. 3 is a flow diagram 300 illustrating a method of deploying wireless devices while retaining reliable links according to an example embodiment.

In 301, a plurality of first wireless devices 101 are installed into first positions in a wireless infrastructure. In an embodiment, the first wireless device 101 is installed in a placed mode for example. Other wireless devices will be placed successively. Before being placed, the other wireless devices will remain in an unplaced mode. Once placed, the other wireless devices will be switched into a placed mode.

In 302, a second wireless device 102 in an unplaced mode is moved away from the plurality of first wireless devices 101 through an area in the wireless infrastructure. In an embodiment, for example in an entrant/attendant use case, the attendant 103 may place the first device into a placed mode outside a confined space. Two more devices will be placed along a chain into the confined space (e.g., a tunnel), and the last wireless device will be carried by the operator 103 continuously moving. In this case the operator needs to be signaled if he roams too far away from the placed nodes.

In 303, a link quality detection message 20 at a reduced power lower is transmitted, while an application message is transmitted at an operating power. The reduced power is lower than the operating power by a headroom.

In 304, a link quality between at least one of the first wireless devices 101 and the second wireless device 102 is estimated based on the link quality detection message.

In 305, a second position to install the second wireless device 102 is determined by using the estimated link quality.

In 306, once installed, the second wireless device 102 is switched from the unplaced mode to the placed mode.

In some embodiments, when the last one of the link quality estimates is found reduced to no more than a minimum level, the second position is determined and the second wireless device 102 signals to an operator 103 to install the second wireless device 102.

In some embodiments, the processes 302-306 as shown in FIG. 3 may be repeated to install one or more other second wireless devices 102 iteratively.

In some embodiments, one link quality estimate remains at or above a minimum. When the last one of the other estimated link quality estimates is found reduced to no more than a minimum level, the second position is determined and the second wireless device 102 signals to an operator 103 to install the second wireless device 102. This may ensure that there are at least two reliable links before the second wireless device 102 is placed. It is noted that at the very beginning, only one first wireless device 101 is placed and is set in the placed mode. Then a second device is placed with a reliable link to the first. After that, with more wireless devices installed, each successive wireless device 102 can be placed with at least two reliable links.

In some embodiment, the last of the second wireless devices 102 to be installed may be used as a roaming device to make the operator 103 aware if he is roaming too far. For example, the last second wireless device 102 may not switch into the placed mode—but rather continues to monitor the link quality and signal the operator 103 who is carrying the last second wireless device 102 whether the link quality is falling below the minimum level. By knowing this, the operator 103 may avoid moving too far away from the installed wireless devices.

Figure 4:
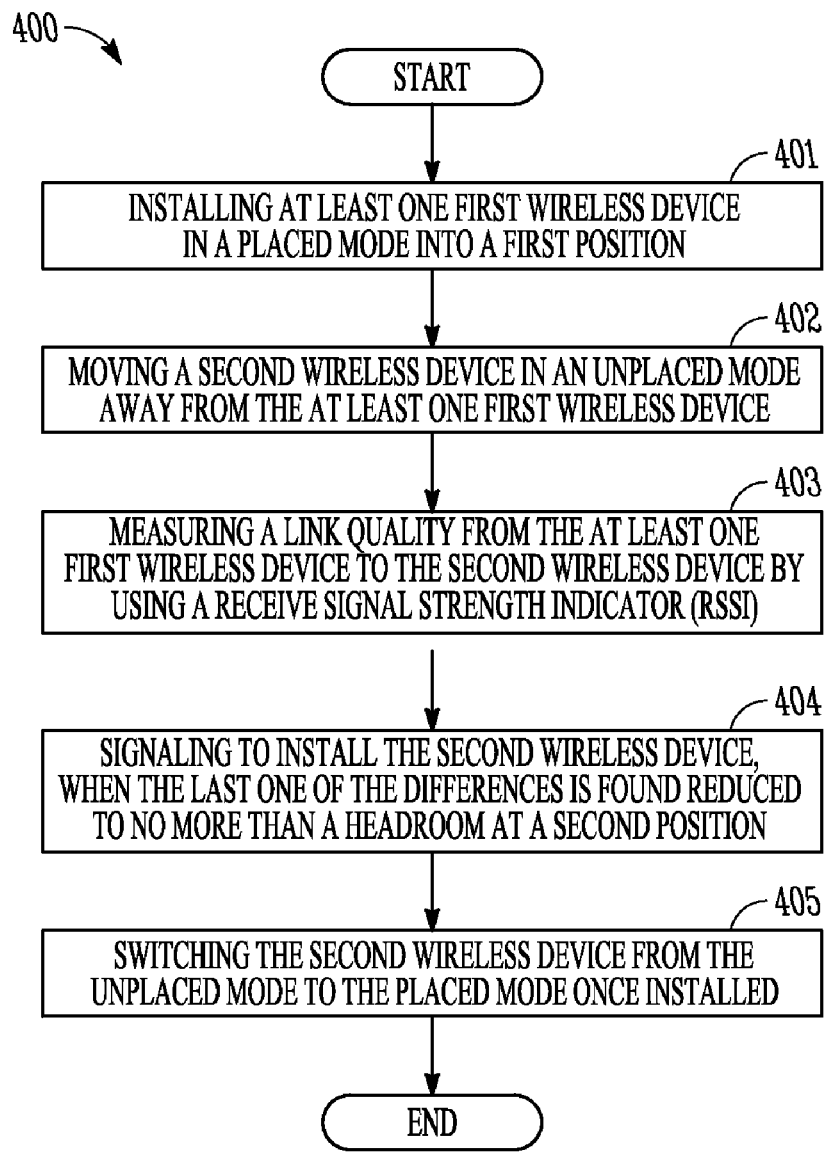
FIG. 4 is a flow diagram illustrating another method of deploying wireless devices while retaining reliable links according to an example embodiment.

FIG. 4 is a flow diagram 400 illustrating another method of deploying wireless devices while retaining reliable links according to an example embodiment.

In 401, a plurality of first wireless devices 101 each in a placed mode are installed into first positions in a wireless infrastructure.

In 402, a second wireless device 102 in an unplaced mode is moved away from at least one of the first wireless devices 101 through an area in the wireless infrastructure.

In 403, a link quality from at least one of the first wireless devices 101 to the second wireless device 102 is measured by using a receive signal strength indicator (RSSI). In an embodiment, the RSSI can be measured by either one of the at least one of the first wireless devices 101 or the second wireless device 102 or both devices. The RSSI information, however, need to be provided to the second wireless device 102 in order to make the placement decision. The RSSI information can be sent to the second wireless device 102 in an application message.

In 404, when the last one of the differences is found reduced to no more than a headroom at a second position, the second wireless device 102 signals an operator 103 to install the second wireless device 102 at the second position.

In 405, the second wireless device 102 is switched from the unplaced mode to the placed mode once installed.

In some embodiments, the processes 402-405 as shown in FIG. 4 may be repeated to install one or more other second wireless devices 102 iteratively.

In some embodiments, the base level is a sensitivity level of a device (e.g., the second wireless device 102).

In some embodiments, the base level is a noise level measured by the second wireless device 102.

In some embodiments, the base level the greater of a noise level measured by the second wireless device 102 or a sensitivity level of a device.

The various embodiments provide a system and a method to optimize the deployment of wireless devices such that the link distances can be maximized while the reliability of communications is retained and very little user attention is needed.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

The invention claimed is:

1. A system comprising:
   at least one first wireless device installed at a first position; and
   a second wireless device to be installed at a second position;
   wherein an application message is transmitted at a normal operating power, and a link quality detection message is transmitted from the at least one first wireless device to the second wireless device at a reduced power that is lower than the operating power by a headroom;
   wherein the second wireless device is moved away from the at least one first wireless device;
   wherein at least one link quality between at least one of the at least one first wireless device and the second wireless device is estimated based on the link quality detection message;
   wherein the at least one estimated link quality is used by the second device to determine the second position to install the second wireless device, and wherein the second wireless device is installed at the second position once the at least one link quality has reduced to a predetermined level; and
   wherein once installed, the second wireless device is operable to transmit another link quality detection message to another wireless device.

2. The system of claim 1, wherein when the last one of the link quality estimates is found reduced to no more than a minimum level, the second position is determined and the second wireless device signals to an operator to install the second wireless device.

3. The system of claim 1, wherein one link quality estimate remains at or above a minimum and a following link quality estimate is found reduced to no more than the minimum level, the second position is determined and the second wireless device signals to an operator to install the second wireless device.

4. The system of claim 1, wherein the link quality detection message is a message packet, and wherein the link quality is detected by at least one of a loss of the message packet or a loss of an acknowledgement packet for the message packet.

5. The system of claim 2, wherein the signal is presented to the operator using an installation indicator selected from at least one of an LCD display icon, a vibrator, or a sound maker.

6. A system comprising:
   at least one first wireless device installed at a first position; and
   a second wireless device to be installed at a second position;
   wherein a receive signal strength indicator (RSSI) is used to measure a link quality from at least one of the at least one first wireless device to the second wireless device;
   wherein the second wireless device is moved away from the at least one first wireless device
   wherein a difference between the RSSI and a base level is determined, and wherein when the difference is found reduced to no more than a predetermined headroom the second position is determined and the second wireless device signals to install the second wireless device; and
   wherein once installed, the second wireless device is operable to transmit a signal strength indicator to another wireless device.

7. The system of claim 6, wherein the second wireless device includes an installation indicator selected from at least one of an LCD display icon, a vibrator, or a sound maker.

8. The system of claim 6, wherein the base level is a sensitivity level of a device.

9. The system of claim 6, wherein the base level is a noise level measured by the second device.

10. A method comprising:
    installing at least one first wireless device at a first position in a wireless infrastructure;

moving a second wireless device away from the at least one first wireless device;

transmitting a link quality detection message from the at least one first wireless device at a reduced power lower than an operating power;

estimating a link quality between the at least one first wireless device and the second wireless device based on the link quality detection message; and determining a second position to install the second wireless device by using the estimated link quality, wherein the second wireless device is installed at the second position once the estimated link quality has reduced to a predetermined level, and wherein once installed, the second wireless device is operable to transmit another link quality detection message to another wireless device.

11. The method of claim 10, wherein
the second wireless device is operable to transmit a link quality detection message to another device.

12. The system of claim 11, wherein one or more other second wireless devices are installed iteratively.

13. The method of claim 10, wherein one link quality estimate remains at or above a minimum and when a following link quality estimate is found reduced to no more than the minimum level, the second position is determined and the second wireless device signals to an operator to install the second wireless device.

14. A method comprising:
installing at least one first wireless device in a placed mode at a first position;

moving a second wireless device in an unplaced mode away from the at least one first wireless device;

measuring a link quality from the at least one first wireless device to the second wireless device by using a receive signal strength indicator (RSSI); and signaling by the second wireless device to install the second wireless device at a second position, when a difference between the link quality and a base level is found reduced to no more than a predetermined headroom at the second position, wherein once installed, the second wireless device is operable to transmit another link quality detection message to another wireless device.

15. The method of claim 14, further comprising:
switching the second wireless device from the unplaced mode to the placed mode once installed.

16. The method of claim 14, wherein after signaling to install the second wireless device, the second wireless device continues to monitor the link quality and signaling at any time until the difference is found reduced to no more than the headroom.

17. The method of claim 14, wherein the base level is a sensitivity level of a device.

18. The method of claim 14, wherein the base level is a noise level measured by the second device.

19. A wireless device, comprising:
a transceiver to transmit and receive wireless communication signals;

a power supply to supply power to the transceiver; and wherein an application message is transmitted by the wireless device at an operating power, and wherein a link quality detection message is transmitted by the wireless device at a reduced power that is lower than the operating power, and wherein a link quality between the wireless device and an other wireless device is estimated based on the link quality detection message, wherein when the estimated link quality is lower than a predetermined level, the other wireless device signals to install the other wireless device at a second position, and wherein once installed, the other wireless device is operable to transmit another link quality detection message to another wireless device.

20. The wireless device of claim 19, further comprising an installation indicator selected from at least one of an LCD display icon, a vibrator, or a sound maker to indicate to install the wireless device once a link quality estimate is reduced to no more than a minimum level.

* * * * *